C. W. THOMPSON.
WEED DESTROYING MACHINE.
APPLICATION FILED JAN. 17, 1917.

1,234,581.

Patented July 24, 1917.

INVENTOR

CHARLES W. THOMPSON

UNITED STATES PATENT OFFICE.

CHARLES W. THOMPSON, OF CALGARY, ALBERTA, CANADA.

WEED-DESTROYING MACHINE.

1,234,581.      Specification of Letters Patent.      Patented July 24, 1917.

Application filed January 17, 1917. Serial No. 142,933.

*To all whom it may concern:*

Be it known that I, CHARLES WARE THOMPSON, of the city of Calgary, in the Province of Alberta, Canada, have invented certain new and useful Improvements in Weed-Destroying Machines, of which the following is the specification.

My invention relates to improvements in weed destroying machines and the object of the invention is to devise a simple form of machine whereby weed roots may be cut in such a manner as to kill the weeds and the cutting blades of which may be easily and readily adjusted to suit different conditions of ground and formation of the surface thereof and it consists essentially of a platform structure supported upon runners, a plurality of cutting bars arranged in V-formation having the apex thereof projecting forwardly, arms extending from the rear end of each runner on which the cutting bars are supported and means for adjusting the arms independently so as to regulate the depth of the cut made by the blade as hereinafter more particularly explained by the following specification.

In the drawings like letters of reference indicate corresponding parts in each figure.

Figure 1:
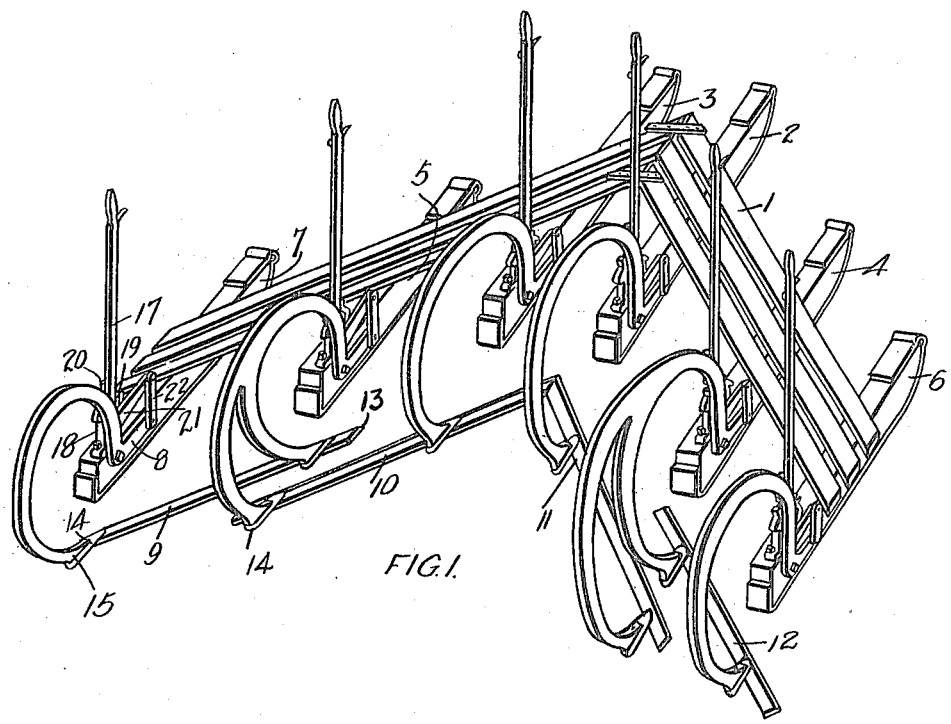
Figure 1, is a general perspective view of my device.
Figure 2:
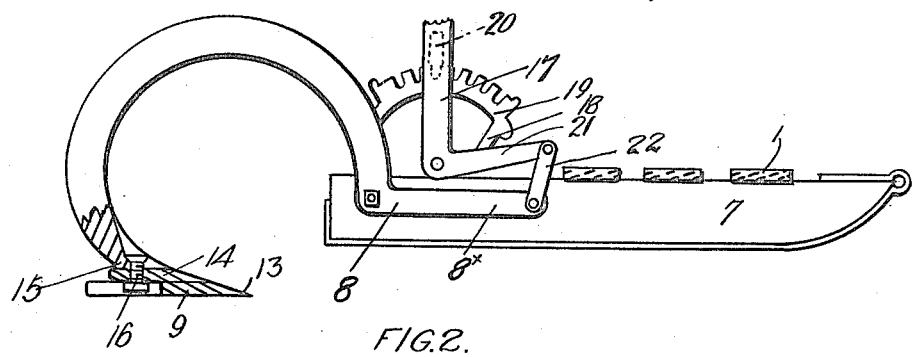
Fig. 2, is a longitudinal section through Fig. 1 in proximity to the left hand runner.

1 indicates a platform which is preferably V-shape in formation having the apex of the V extending in a forward direction. The platform 1 is supported upon a series of runners 2, 3, 4, 5, 6 and 7, to the front portion of which a draft gear may be attached in any usual manner. To each runner 2, 3, 4, 5, 6 and 7 is pivotally secured an arm 8, the rear portion of which curves upward, rearward and downward in circular hook formation, the lower end of the hook depending below the level of a corresponding runner.

9, 10, 11 and 12 indicate cutting bars having forward cutting edges 13. 14 indicate lugs which are welded on to each of the cutting bars 9, 10, 11 and 12. The lower end of each hook-shaped portion of each arm 8 is provided with a foot 15 which rests upon the top of a corresponding lug 14 and is secured thereto by a suitable rivet or bolt 16. 17 indicates a lever pivotally connected to a bracket 18 carried by each of the runners 2, 3, 4, 5, 6 and 7. The bracket 18 is provided with a quadrant 19 co-acting with a spring locking dog 20 carried by each lever 17 and operated in the usual manner. The lower end of the lever is provided with a forwardly extending arm 21. 22 indicates a link pivotally connected at one end to the arm 21 and pivotally connected at its opposite end to an extension $8^x$ of the arm 8.

It will thus be seen that by swinging the lever either in one direction or the other the opposite end of the arm may be raised or lowered as desired so as to adjust the corresponding cutting bar 9, 10, 11 or 12 to the position desired.

It will be noticed on referring to Fig. 1 that the cutting bars 10 and 11 are arranged in the center of the machine in V-form having the apex of the V projecting forwardly, the cutting bars 9 and 12 being arranged substantially parallel to the cutting bars 10 and 11 and overlapping the same at their inner ends.

As the machine is drawn over the surface of the land the cutting bars may be raised or lowered as desired to cut through the earth the desired distance below the surface thereof in order to cut through the weed roots and destroy the weeds growing therein.

From this description it will be seen that I have devised a very simple form of machine whereby the entire surface of the land may be undercut so as to thoroughly destroy the weeds.

As this machine is designed to cut through the ground at a distance of one to three inches below the level thereof it will be seen that the maximum adjustment of the cutting bars is only two inches and that there is sufficient spring to these bars to allow of the adjustment being made independently by adjusting the levers, that is to say, if it is desired to cut deeper the cutting bar at one end is first forced downward, then the center or overlapping portions of the bar are forced downwardly and then the inner portion until the required depth is attained.

What I claim as my invention is:

1. In a weed destroying machine, a platform supported upon suitable carriers, overlapping parallel cutting bars located behind such platform and over which the cut earth passes, and a supporting arm extending rearwardly from a platform carrier and to which the overlapping portions of the parallel cutting bars are secured.

2. In a weed destroying machine, a platform, suitable carriers for the platform, cutting bars arranged in V-formation, each arm of the V comprising a plurality of overlapping bar members, carrier arms secured to the platform carriers and extending rearwardly thereof and to which the cutting bars are secured.

3. In a weed destroying machine, a platform, suitable carriers for the platform, a plurality of overlapping cutting bars, a supporting arm pivotally carried by a platform carrier and to the rearward end of which a cutting bar is connected, and an intermediate arm supporting the overlapping portion of two bars.

4. In a weed destroying machine, a platform, suitable carriers for the platform, cutting bars arranged in V-formation, supporting arms pivotally carried by the platform carriers and to the rearward end of which the cutting bars are connected, a substantially horizontal extension to each cutting bar supporting arm, a lever pivoted to the platform structure, a rack quadrant and dog co-acting therewith, an arm extending forwardly from the lower end of such lever, and a link connecting the lever arm with the rearward extension of the cutting bar supporting arm.

C. W. THOMPSON.

Witnesses:
INEZ E. THOMPSON,
ANNIE M. WILLISON.

Copies of this patent may be obtained for five cents each, by addressing the "Commissioner of Patents, Washington, D. C."